United States Patent
Choi

(10) Patent No.: US 7,603,757 B2
(45) Date of Patent: Oct. 20, 2009

(54) METHOD OF MANUFACTURING MOLD FOR PRODUCING CATALYST CARRIERS

(75) Inventor: Myung-Sik Choi, Seoul (KR)

(73) Assignee: Hyundai Motor Company, Seoul (KR)

( * ) Notice: Subject to any disclaimer, the term of this patent is extended or adjusted under 35 U.S.C. 154(b) by 861 days.

(21) Appl. No.: 11/304,921

(22) Filed: Dec. 14, 2005

(65) Prior Publication Data

US 2007/0086824 A1    Apr. 19, 2007

(30) Foreign Application Priority Data

Oct. 13, 2005    (KR) ...................... 10-2005-0096420

(51) Int. Cl.
    *B21D 39/02*    (2006.01)
(52) U.S. Cl. ..................................... 29/463
(58) Field of Classification Search .................... 29/463, 29/423, 469, 418, 896.6, 558; 400/213; 228/160; 425/463, 464; 72/253.1
    See application file for complete search history.

(56) References Cited

U.S. PATENT DOCUMENTS

| | | | |
|---|---|---|---|
| 4,640,454 A | 2/1987 | Yamamoto et al. | |
| 5,190,702 A | 3/1993 | Johnson | |
| 5,876,804 A | 3/1999 | Kodama et al. | |
| 5,964,020 A | 10/1999 | Kragle et al. | |
| 6,080,348 A * | 6/2000 | Shalkey | 264/177.12 |
| 6,290,837 B1 | 9/2001 | Iwata et al. | |
| 6,317,960 B1 | 11/2001 | Kragle | |
| 6,814,562 B2 | 11/2004 | Shibagaki et al. | |
| 7,294,304 B2 * | 11/2007 | Wada et al. | 264/630 |
| 7,500,847 B2 * | 3/2009 | Takahashi et al. | 425/380 |

FOREIGN PATENT DOCUMENTS

| | | |
|---|---|---|
| JP | 9070543 | 3/1997 |
| KR | 10-1998-0031639 | 2/2000 |

* cited by examiner

*Primary Examiner*—John C Hong
(74) *Attorney, Agent, or Firm*—Morgan, Lewis & Bockius LLP

(57) ABSTRACT

A method of manufacturing a mold for producing a catalyst carrier, which has a circular cross-sectional cell structure to realize high cell density and form a very thin web, compared to conventional arts, using a bundle of I-shaped pins.

10 Claims, 5 Drawing Sheets

US 7,603,757 B2

METHOD OF MANUFACTURING MOLD FOR PRODUCING CATALYST CARRIERS

CROSS-REFERENCE TO RELATED APPLICATIONS

The present application is based on, and claims priority from, Korean Application Serial Number 10-2005-0096420, filed on Oct. 13, 2005, the disclosure of which is hereby incorporated by reference herein in its entirety.

FIELD OF THE INVENTION

The present invention relates to method of manufacturing molds for producing catalyst carriers and, more particularly, to a method of manufacturing a mold for producing catalyst carriers provided with cells each having a circular cross-section.

BACKGROUND OF THE INVENTION

Generally, catalyst carriers have shapes such that cells thereof are arranged in a honeycomb shape. A mold for producing such catalyst carriers is an extrusion mold. That is, material is injected into one side of the mold by pressing, so that a product is formed while being discharged through the opposite side of the mold.

In conventional arts, most cells have square or hexagonal cross-sections. Molds for producing catalyst carriers have been manufactured by grinding machining or electric discharge machining. Therefore, due to limits of machining accuracy, there is a difficulty in manufacturing a mold which is able to produce catalyst carriers having cell density of approximately 900 cpsi (cells per square inch) and a web having a thickness of approximately 2.5 mil (mili-inches).

SUMMARY OF THE INVENTION

Embodiments of the present invention provide a method of manufacturing a mold for producing catalyst carriers having circular cross-sectional cell structures to realize high cell density and to form a very thin web.

A method of manufacturing a mold for producing catalyst carriers according to an embodiment of the present invention includes the pin manufacturing step of manufacturing a plurality of I-shaped pins, each having head parts, which are provided on upper and lower ends thereof, and a medial part which is provided between the head parts and has a diameter less than a diameter of each of the head parts. At the pin assembly step, the I-shaped pins are assembled and adhered with each other such that the I-shaped pins form one plane. At the welding step, a feed hole plate is formed by bonding the upper and lower ends of the assembled I-shaped pins to each other by welding. At the cutting step, intermediate portions of the welded I-shaped pins are cut. At the coordinate setting step, coordinates of feed holes are set ori the welded portions of the I-shaped pins. At the feed hole machining step, the feed holes are machined in the feed hole plate at the set coordinates of the feed holes.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Hereinafter, an embodiment of the present invention will be described in detail with reference to the attached drawings.

Figure 1:
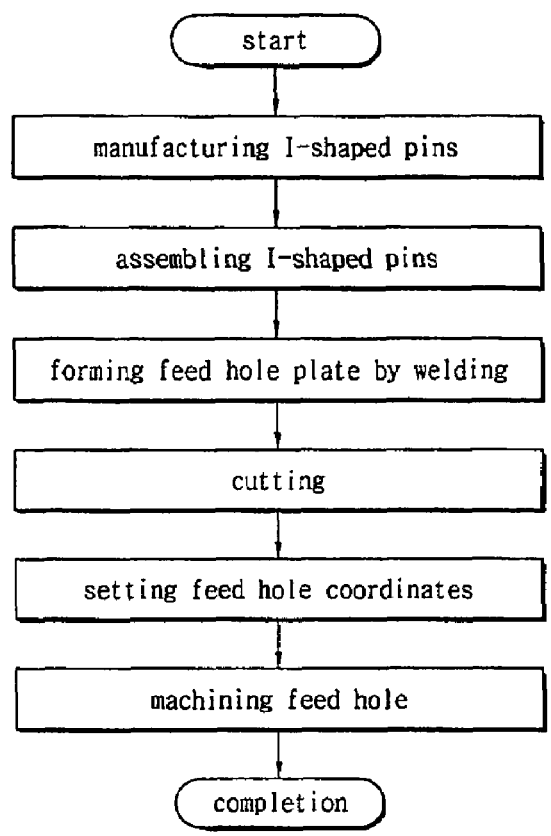
FIG. 1 is a flowchart of a method of manufacturing a mold for producing catalytic carriers, according to an embodiment of the present invention.

FIG. 1 is a flowchart of a method of manufacturing a mold for producing catalytic carriers, according to an embodiment of the present invention. The mold manufacturing method of the present invention includes the pin manufacturing step of manufacturing a plurality of I-shaped pins 3. Each I-shaped pin 3 has head parts 1 which are provided on upper and lower ends of the I-shaped pin 3, and a medial part which is provided between the head parts 1 and has a diameter less than the diameter of each head part 1. The mold manufacturing method further includes the pin assembly step of assembling and adhering the I-shaped pins 3 with each other such that the I-shaped pins 3 form one plane, and a welding step of forming a feed hole plate 5 by bonding the upper and lower ends of the assembled I-shaped pins 3 to each other by welding. The mold manufacturing method further includes a cutting step of cutting intermediate portions of the welded I-shaped pins 3, a coordinate setting step of setting coordinates of feed holes 7 on the welded portions of the I-shaped pins 3, and a feed hole machining step of machining the feed holes 7 in the feed hole plate 5 at the set coordinates of the feed holes 7.

Figure 2:
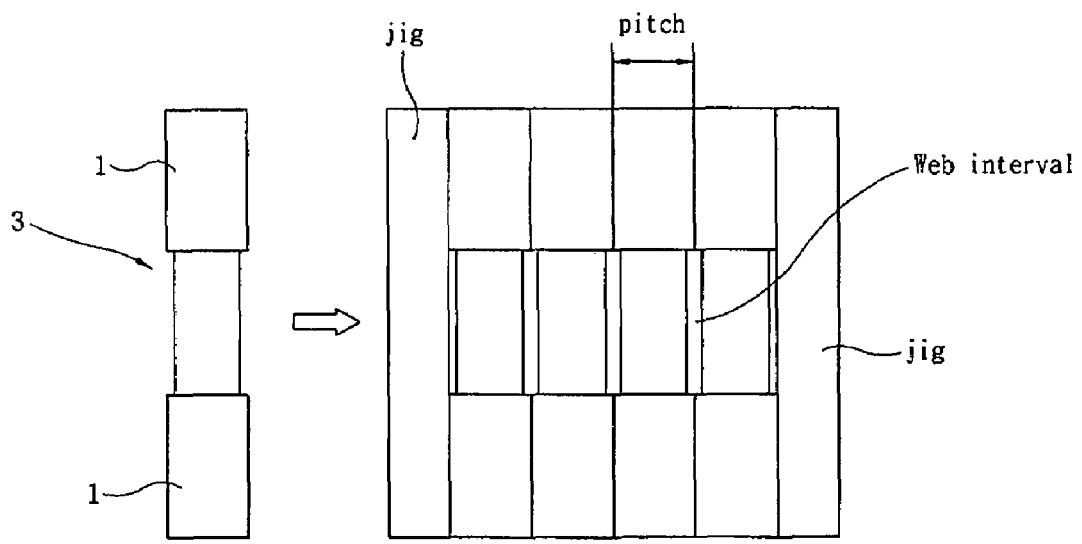
FIG. 2 is a view illustrating a process of assembling I-shaped pins together according to the present invention.

The pin manufacturing step and the pin assembly step are shown in FIG. 2. The head parts 1, provided on the upper and lower ends of the I-shaped pins 3, are portions to be formed into the feed hole plates 5 by coupling the upper and lower ends of the I-shaped pins 3 to each other through a welding process and by building them up. The medial parts of the I-shaped pins 3 are the portions that substantially form the web of the catalyst carrier to be produced.

Therefore, the diameter of each I-shaped pin 3 determines the pitch of each cell of the catalyst carrier. The gap defined between the medial parts of adjacent I-shaped pins 3 determines the thickness of the web of the catalyst carrier.

Figure 6:
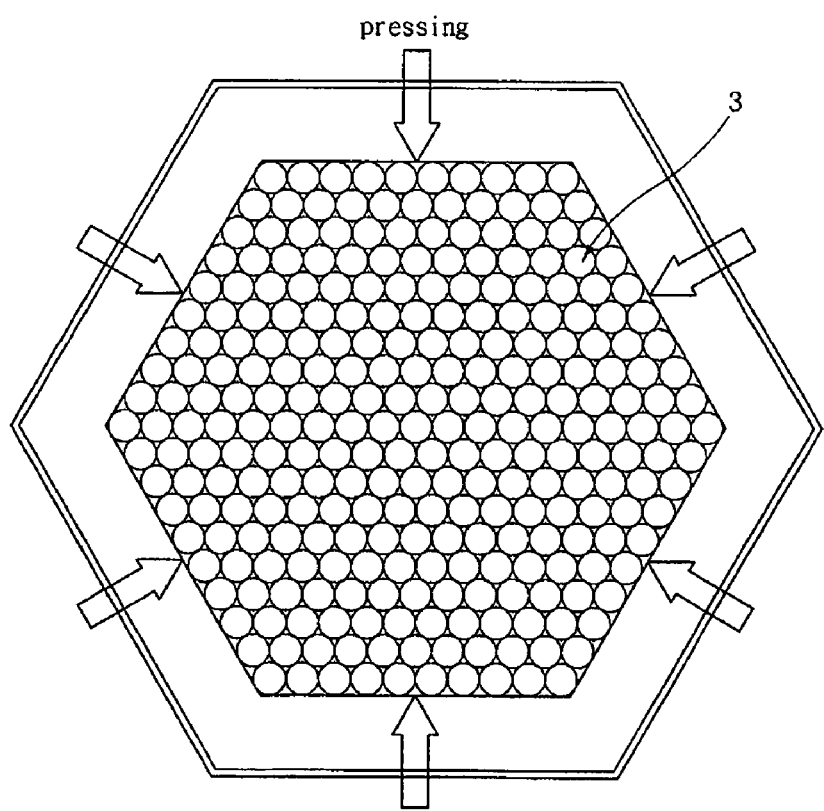
FIG. 6 is a view illustrating both an assembled state of the I-shaped pins and a method of pressing the assembled I-shaped pins during the welding step according to the present invention.

FIG. 6 is a plan view of the I-shaped pins 3 of FIG. 2, in the pin assembly step. As shown in FIG. 6, it is preferable that the I-shaped pins 3 be assembled such that they form a regular hexagonal plane. The reason for this is that, because a catalyst carrier, which is a final product, is typically circular, the ratio of an application area to be actually used in a production process with respect to the area of assembled pins is greater than that of the case in which the I-shaped pins 3 are assembled into a square or triangular shape.

Figure 3:
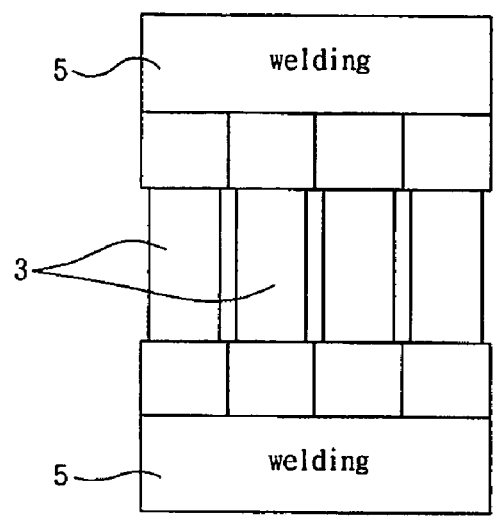
FIG. 3 is a view showing a feed hole plate formed by welding according to the present invention.

At the welding step, as shown in FIG. 3, the upper and lower ends of the I-shaped pins 3 are built up by welding, thus forming the feed hole plates 5.

In detail, the head parts 1 of the I-shaped pins 3 are integrally welded using a process such as a laser cladding process. Simultaneously, the head parts 1 of the I-shaped pins 3 are built up by supplying and melting metal powder until the head parts 1 reaches a desired thickness, thus forming the feed hole plates 5.

Figure 7:
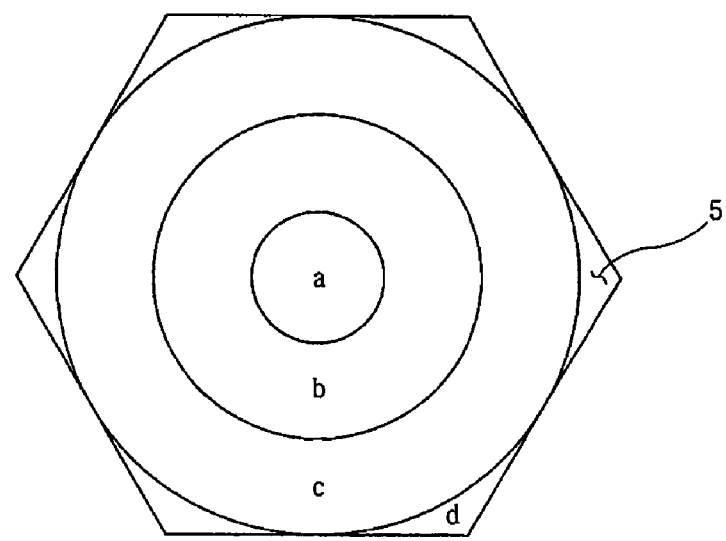
FIG. 7 is a view showing an example of a method of partitioning the assembled I-shaped pins into a plurality of sections at the welding step according to the present invention.
Figure 8:
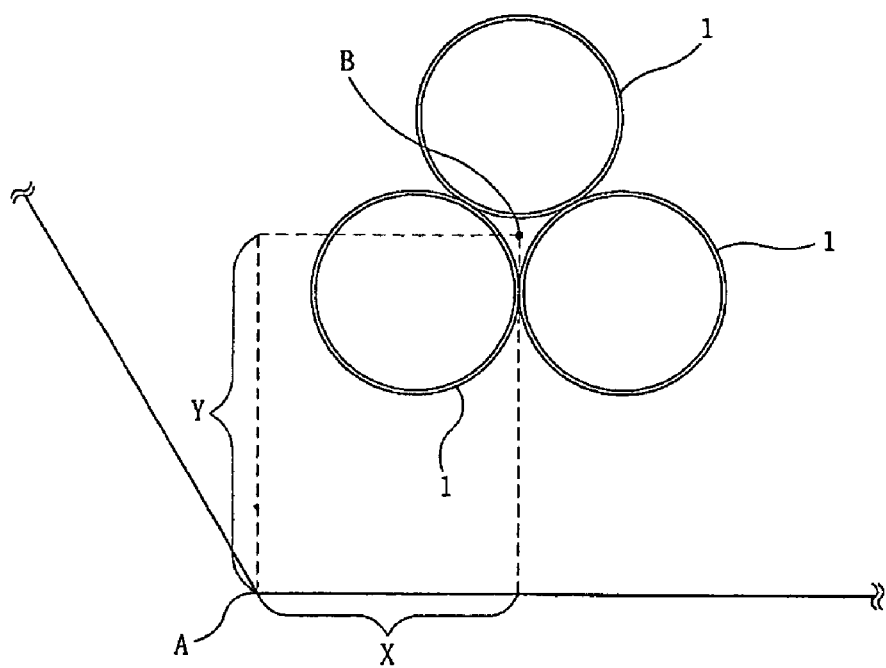
FIG. 8 is a view illustrating a method of determining coordinates of a center of a feed hole to be machined, on the basis of a reference point of the feed hole plate according to the present invention.
Figure 9:
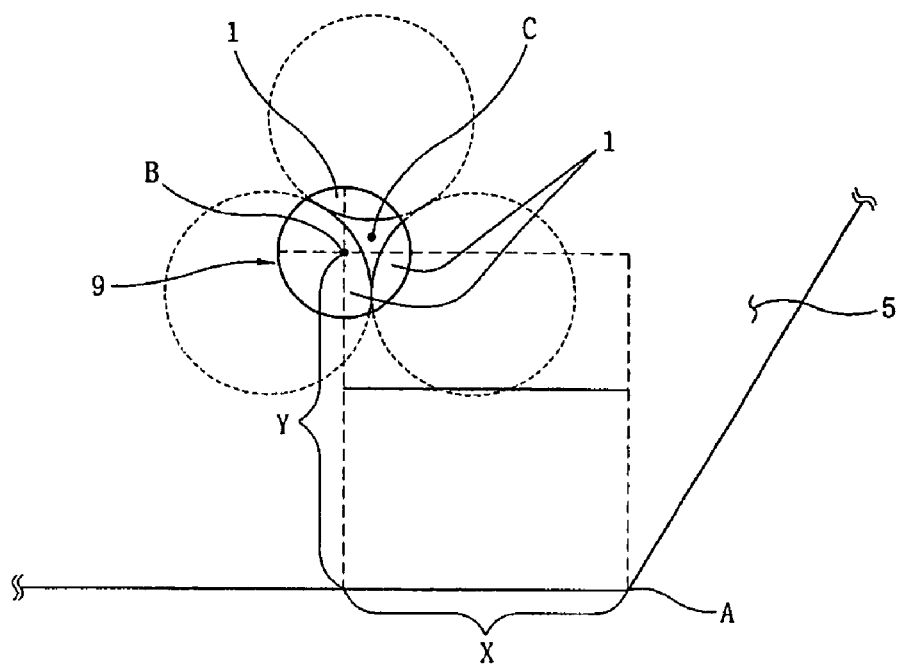
FIG. 9 is a view showing a process of forming an observation hole at the set coordinates of the feed hole shown in FIG. 8 and of adjusting the coordinates of the center of the feed hole to a precise position.
Figure 10:
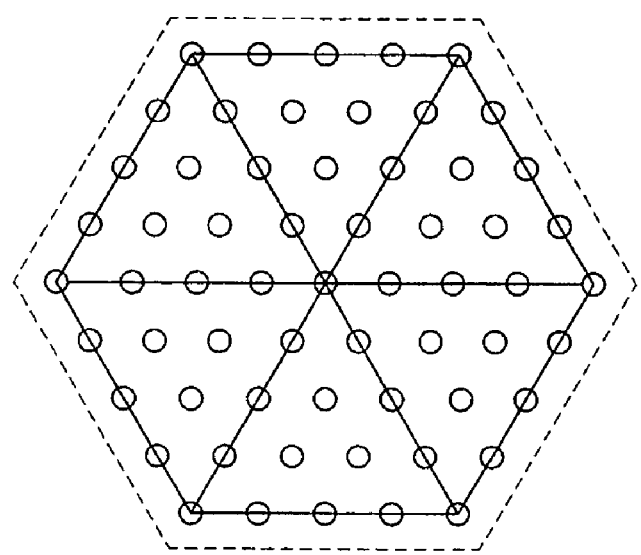
FIG. 10 is a view showing a plurality of observation holes formed in the feed hole plate according to the present invention.

At this time, at the welding step, it is preferable that the upper and lower ends of the I-shaped pins 3 be alternately welded. Furthermore, as shown in FIG. 7, it is preferable that the upper and lower ends of the I-shaped pins 3 be partitioned into a plurality of sections a, b, c and d and be sequentially welded, thus preventing a bundle of I-shaped pins 3 from being thermally deformed due to welding heat.

In the welding process, gaps between the I-shaped pins 3 are filled by welding. Furthermore, because a phenomenon, in which the volume of the bundle of I-shaped pins 3 is reduced by plastic deformation of the I-shaped pins 3, may be induced, the I-shaped pins 3 should be pressed in the direction indicated by the arrows of FIG. 6. Then, the I-shaped pins 3 maintain the state of being regularly arranged, without being disarranged by a reduction in volume of the bundle of I-shaped pins 3.

This is necessary to ensure the accuracy of coordinates of the feed holes 7 to be set at the feed hole setting step, which will be described later herein.

Not shown in FIG. 1, it is preferable that the annealing step of annealing the feed hole plate 5 formed by welding be performed after the welding step of forming the feed hole plate 5 is performed. This prevents gaps between the I-shaped pins 3 from changing at the following cutting step due to residual stress of the feed hole plate 5 resulting from welding.

Figure 4:
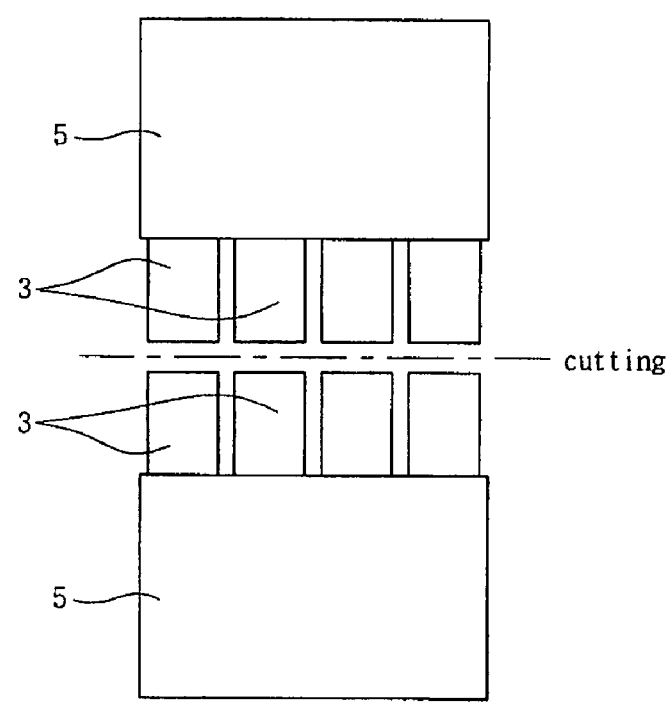
FIG. 4 is a view illustrating the cutting step according to the present invention.

As shown in FIG. 4, when the welded I-shaped pins 3 are cut at a medial position into two parts, each of the two parts becomes a medium of a mold.

Hereinafter, the embodiment will be explained with only one medium produced at the cutting step.

At the coordinate setting step, temporary coordinates B of a center of a feed hole 7, to be machined on the basis of a reference point A of the feed hole plate 5, are determined on the front surface of the feed hole plate 5 from which the I-shaped pins 5 protrude. Thereafter, an observation hole 9, having a diameter smaller than the diameter of the feed hole 7 and extending from the rear surface of the feed hole plate 5 to the boundary between the head parts 1 of the I-shaped pins 3 and the feed hole plate 5, is formed at the determined temporary coordinates B. Subsequently, the center C of a space, which exists between head parts 1 of three adjacent I-shaped pins 3 when observed through the rear surface of the feed hole plate 5 while light is radiated onto the front surface of the feed hole plate 5, is determined as the center of the feed hole 7.

As such, after the observation hole 9 is formed, when observing this using a microscope while light is radiated, the space between the head parts 1 of three adjacent I-shaped pins 3 is observed. At this time, the center C of this space is regarded as the true center of the feed hole 7. Thereafter, at the feed hole machining step, the feed hole 7 is formed at the true center C of the feed hole 7. Because the diameter of the feed hole 7 is greater than the diameter of the observation hole 9, even if the temporary center B of the observation hole 9 is slightly misaligned with the real center C of the feed hole 7, the observation hole 9 is prevented from being excluded from the machined feed hole 7.

All of the coordinates of the feed holes 7 may be determined by the above-mentioned method. However, in the interests of rapidity of work, after a plurality of observation holes 9, which are spaced apart from each other at regular intervals greater than an interval between adjacent feed holes, is formed, the coordinates of feed holes to be formed among the observation holes 9 may be set by interpolation.

The reference point A of the feed hole plate 5 is an arbitrary point determined at a position suitable for setting on the basis of coordinates.

Figure 5:
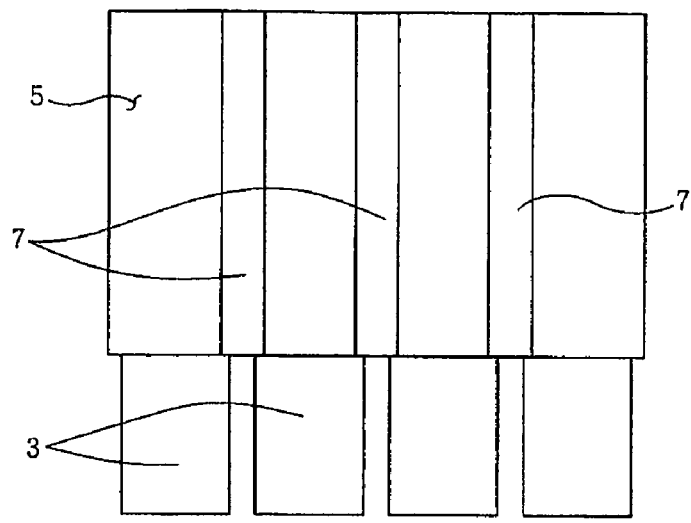
FIG. 5 is a view schematically showing a completed mold according to the present invention.

As such, when the feed holes 7 are machined in the feed hole plate 5, the mold is completed, as shown in FIG. 5. Here, in the case that it is difficult to form the feed hole plate 5 by welding to a desired thickness, the assistant plate coupling step of manufacturing a separate assistant plate, having the same holes as the feed holes 7 of the feed hole plate 5, and of coupling the assistant plate to the rear surface of the feed hole plate 5 may be further performed. Then, the mold with the feed hole plate 5 having the desired thickness is easily manufactured.

In the mold manufactured by the above-mentioned method, because the diameter of the head parts 1 of the I-shaped pins 3 and the diameter of the medial parts thereof can be easily adjusted through a separate process such as a cutting process, cell density and the thickness of the web can be easily realized to desired values.

As is apparent from the foregoing, the present invention is able to produce catalyst carriers having circular cross-sectional cell structures having high cell density and to form a very thin web, compared to the conventional arts.

What is claimed is:

1. A method of manufacturing a mold for producing catalyst carriers, comprising:
    manufacturing a plurality of I-shaped pins each comprising head parts provided on upper and lower ends thereof, and a medial part provided between the head parts and having a diameter less than a diameter of each of the head parts;
    assembling and adhering the I-shaped pins with each other such that the I-shaped pins form one plane;
    forming a feed hole plate by securing the upper and lower ends of the assembled I-shaped pins to each other;
    cutting intermediate portions of the secured I-shaped pins;
    a coordinate setting step of setting coordinates of feed holes on the secured portions of the I-shaped pins; and
    a feed hole machining step of machining the feed holes in the feed hole plate at the set coordinates of the feed holes.

2. The method as defined in claim 1, wherein, at the pin assembly step, the I-shaped pins are assembled such that the I-shaped pins form a plane having a regular hexagonal shape.

3. The method as defined in claim 1, wherein said securing comprises welding.

4. The method as defined in claim 3, wherein the feed hole plate is formed by welding the upper and lower ends of the I-shaped pins to each other and by building the upper and lower ends up.

5. The method as defined in claim 4, wherein the upper and lower ends of the I-shaped pins are alternately welded.

6. The method as defined in claim 5, wherein the upper and lower ends of the I-shaped pins are partitioned into a plurality of sections and are sequentially welded.

7. The method as defined in claim 1, wherein the coordinate setting step comprises:
- determining temporary coordinates of a center of a feed hole to be machined with respect to a reference point of the feed hole plate on a front surface of the feed hole plate from which the I-shaped pins protrude;
- forming an observation hole, having a diameter smaller than a diameter of the feed hole and extending from a rear surface of the feed hole plate to a boundary between the head parts of the I-shaped pins and the feed hole plate, at the determined temporary coordinates; and
- determining a center of a space, existing between head parts of three adjacent I-shaped pins when observed through the rear surface of the feed hole plate while light is radiated onto the front surface of the feed hole plate, as a center of the feed hole.

8. The method as defined in claim 7, wherein the observation hole comprises a plurality of observation holes, which are spaced apart from each other at regular intervals greater an interval between adjacent feed holes, and coordinates of feed holes to be formed among the observation holes are set by interpolation.

9. The method as defined in claim 1, further comprising: annealing the feed hole plate after the securing.

10. The method as defined in claim 1, further comprising: manufacturing a separate assistant plate having holes identical to the feed holes of the feed hole plate, and coupling the assistant plate to a rear surface of the feed hole, after the feed hole machining step.

\* \* \* \* \*